June 22, 1965  J. WHITEMAN  3,190,117
LIQUID METERING APPARATUS AND CONTROL THEREFOR
Filed Dec. 26, 1962  3 Sheets-Sheet 1
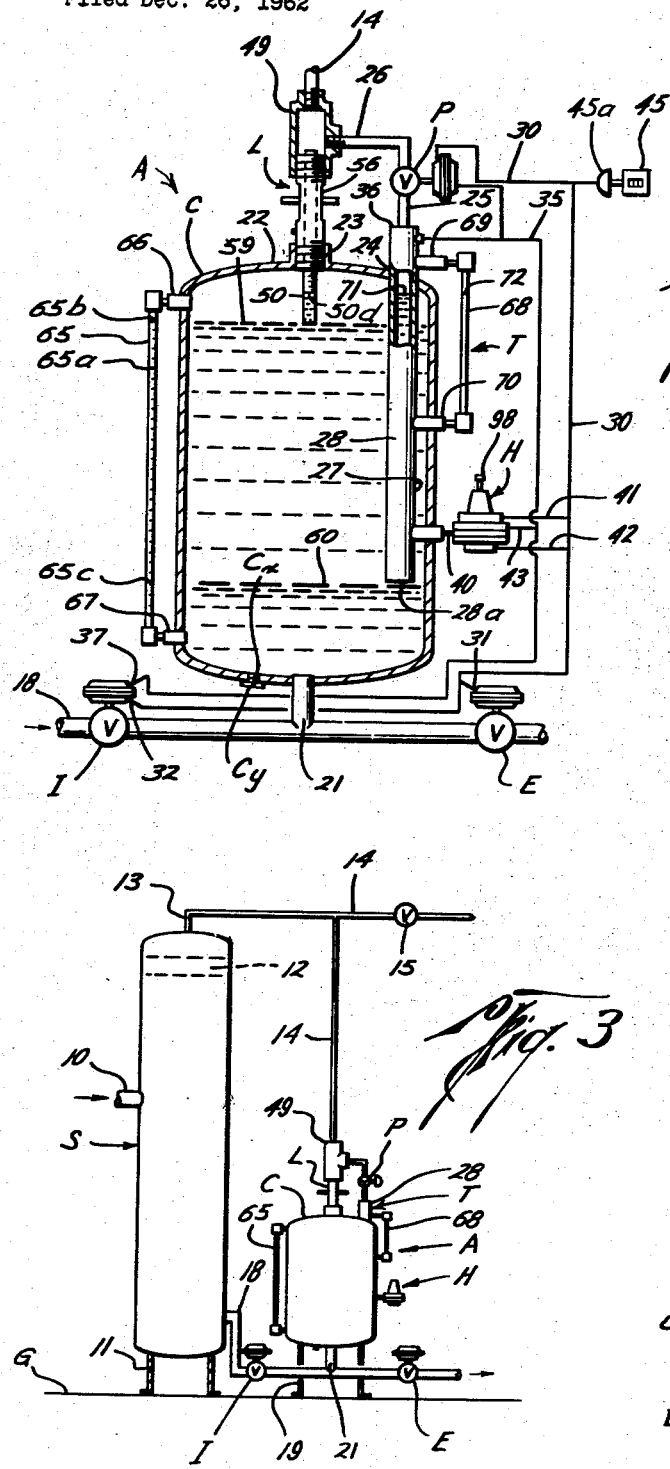
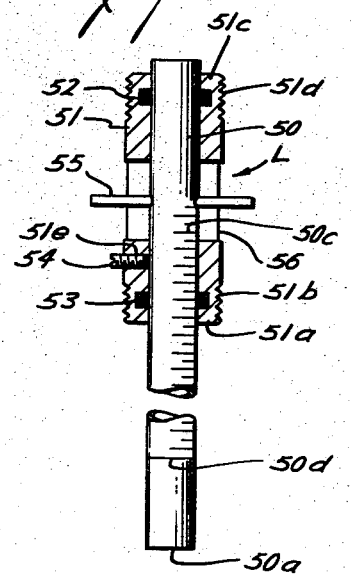
Jack Whiteman
INVENTOR.
BY *Hayden & Pravel*
ATTORNEYS

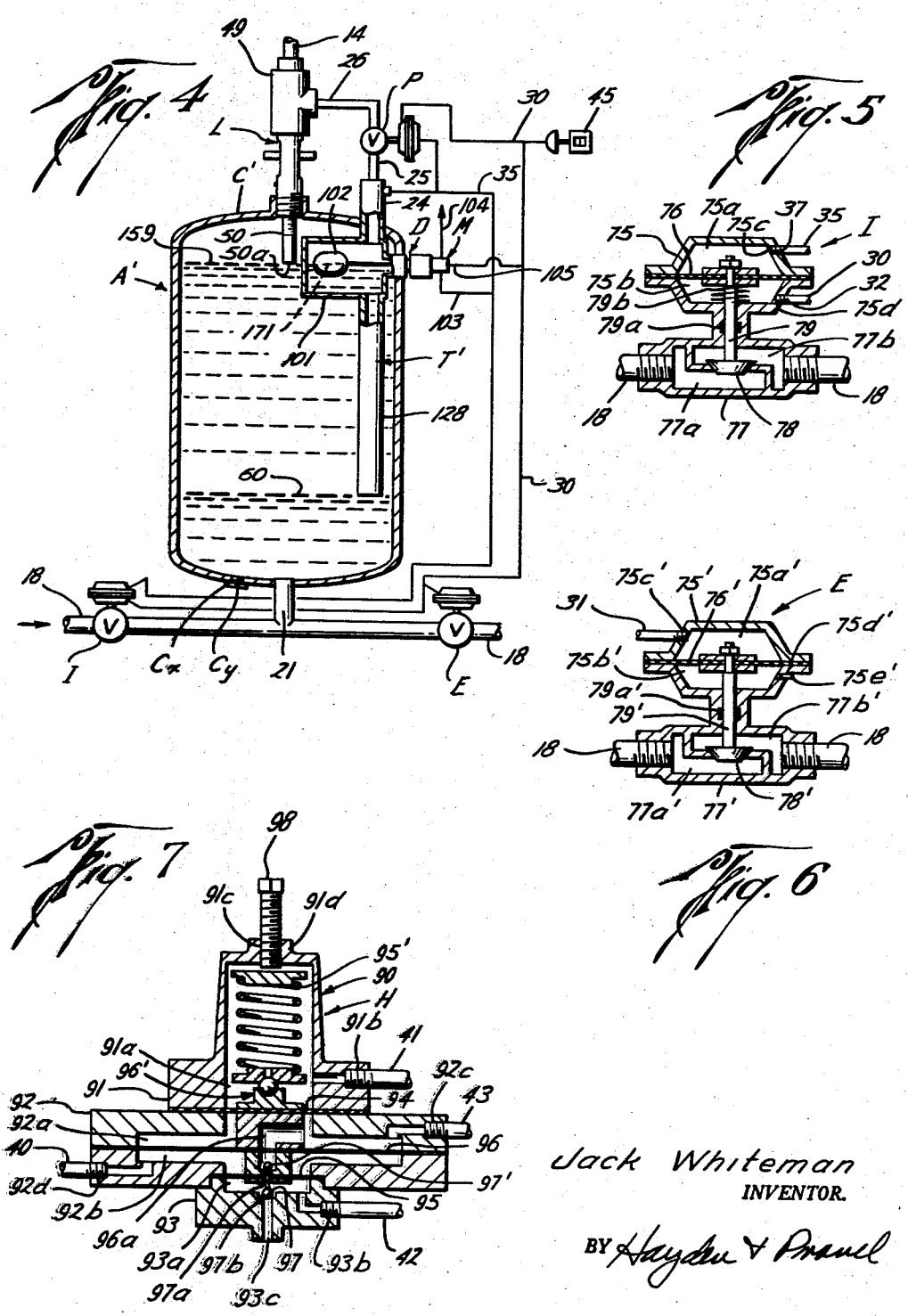

June 22, 1965
J. WHITEMAN
3,190,117
LIQUID METERING APPARATUS AND CONTROL THEREFOR
Filed Dec. 26, 1962
3 Sheets-Sheet 3
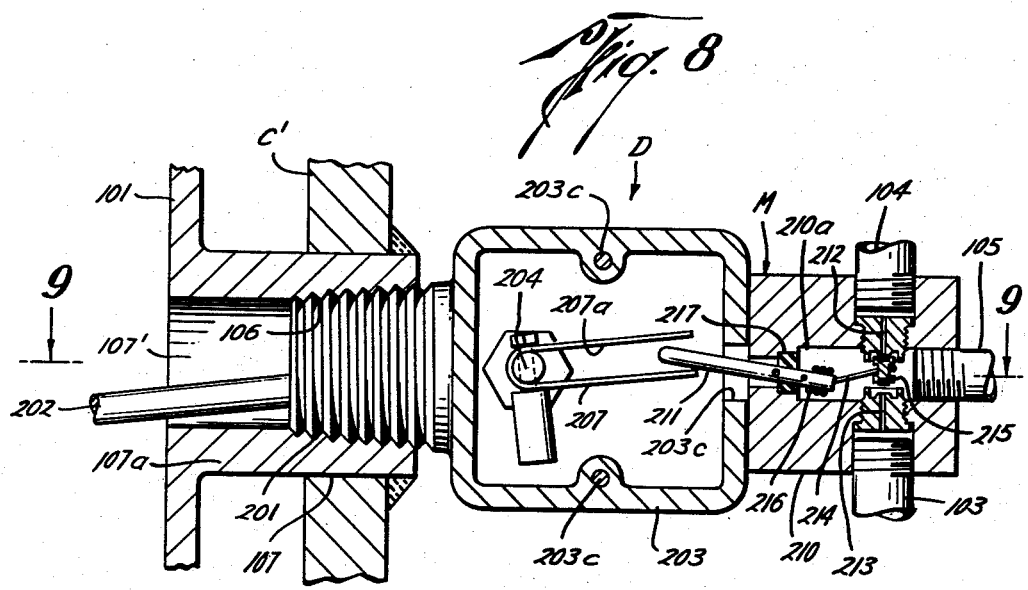
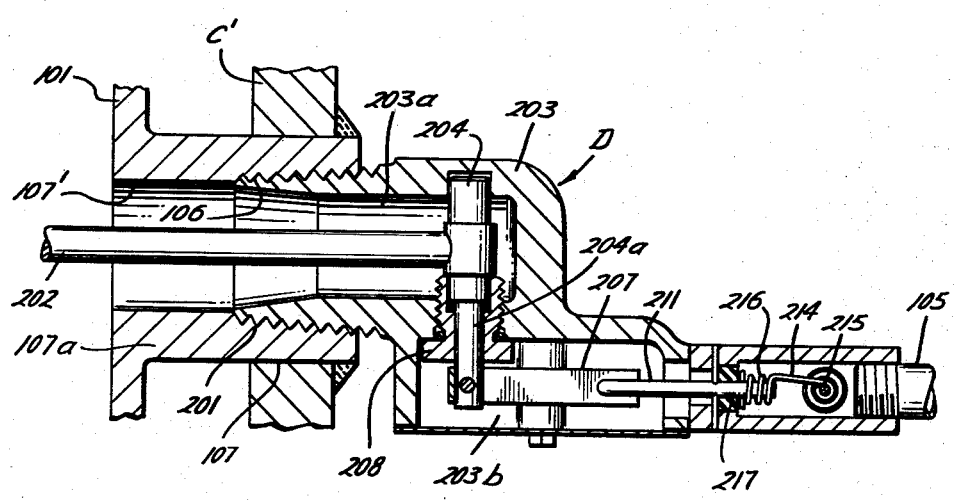
Jack Whiteman
INVENTOR.
BY Hayden & Pravel
ATTORNEYS

United States Patent Office 3,190,117
Patented June 22, 1965

3,190,117
LIQUID METERING APPARATUS AND CONTROL
THEREFOR
Jack Whiteman, 2820 Jarrard, Houston, Tex.
Filed Dec. 26, 1962, Ser. No. 246,960
11 Claims. (Cl. 73—223)

The present invention relates to a new and improved apparatus for metering or measuring liquids and a control arrangement for liquid metering devices.

An object of the present invention is to provide a con-arrangement for a liquid metering or measuring apparatus which provides a high degree of accuracy.

Another object of the present invention is to provide a unique control arrangement for automatically sequencing the opening and closing of inlet and discharge valve means on a liquid measuring container to enable the collection of a predetermined liquid volume in the container while the inlet valve is open and discharge valve is closed and thereafter closing the inlet valve and then opening the discharge valve for discharge of the predetermined liquid volume from the container.

Another object of the present invention is to provide a unique control arrangement for automatically sequencing the opening and closing of inlet and discharge valve means on a liquid measuring container to enable the collection of a predetermined liquid volume in the container while the inlet valve is open and discharge valve is closed and thereafter closing the inlet valve and then opening the discharge valve for discharge of the predetermined liquid volume from the container, the control arrangement functioning after the predetermined liquid volume is discharged to first close the discharge valve prior to opening the inlet valve for collection of additional liquid in the container.

Still a further object is to provide a control arrangement for liquid measuring which is actuated by the liquid level of a relatively small liquid volume to collect and then discharge a predetermined liquid volume from a relatively large collection container to thereby provide a sensitive, accurate measurement heretofore substantially impossible to attain.

Still another object of the present invention is to provide a new and improved liquid metering apparatus in which repairs and replacement may be readily accomplished.

A further object of the present invention is to provide a new and improved liquid metering apparatus for measuring quantities of oil or other liquids as such oil or other liquid leaves a lease or the like and which apparatus may be easily and readily calibrated for measuring various amounts of oil or other liquid.

A further object of the present invention is to provide an apparatus which accurately meters liquid and which includes a unique liquid level adjustment means which is relatively simple and easy to operate to predetermine the liquid volume of the meter.

Yet a further object of the present invention is to provide an apparatus for metering liquid which is constructed and arranged so that it functions positively and accurately to dump the liquid being metered.

Still another object of the invention is to provide in a liquid meter a means for locking the meter in open position until an accurately measured amount of liquid is dumped therefrom.

Still a further object of the present invention is to provide a new and improved liquid metering apparatus utilizing a collection container and a substantially smaller liquid receiving container in liquid receiving communication with the collecton container so that when a predetermined volume of liquid is collected in said container, the liquid will rise to a predetermined level in the smaller liquid receiving container and actuate a hydrostatically controlled mechanism to drain the liquid from the larger container, said hydrostatic mechanism operating means to lock the liquid in the smaller container therein until the predetermined liquid volume is first drained from the larger container whereupon the liquid in the smaller container is then drained and the hydrostatically controlled mechanism is again activated to effect filling of the containers again. This operation is repeated automatically as long as liquid is supplied to the metering apparatus.

Yet a further object of the present invention is to provide a new and improved liquid metering or measuring apparatus wherein a container means is continuously automatically filled with a predetermined volume and then emptied upon the liquid level in said container means reaching first a predetermined upper level and then a predetermined lower level, the filling and dumping being accomplished without the use of float valves.

Still a further object of the present invention is to provide a new and improved liquid metering or measuring apparatus wherein a container means is continuously filled and emptied upon the liquid level in said container means reaching first a predetermined upper level and secondly a predetermined lower level, wherein a single float valve is utilized and such float valve being controlled or operated by a liquid level in a smaller container that communicates with said container means.

Other objects and advantages will be more readily apparent from a reading of the following specification and by reference to the accompanying drawings forming a part thereof wherein:

FIG. 1 is a view partly schematic and partly in section illustrating a form of the liquid metering device of the present invention;

FIG. 2 is an enlarged sectional view, partly in elevation, illustrating the details of the upper level adjustment mechanism and calibrating apparatus forming part of the present invention;

FIG. 3 is a view partly schematic and partly in elevation illustrating the form of the liquid metering device shown in FIG. 1 in relation to a separator but omitting some of the structure that is shown in FIG. 1;

FIG. 4 is a view similar to that of FIG. 1 but illustrating another embodiment of the invention;

FIG. 5 is an enlarged sectional view partly schematic illustrating one form of a double acting valve which may be used in the present invention;

FIG. 6 is an enlarged sectional view partly schematic illustrating one form of a single acting valve which may be used in the present invention;

FIG. 7 is an enlarged sectional view illustrating one form of a hydrostatically actuated controller adapted to be used in the present invention;

FIG. 8 is an enlarged sectional view of one form of a snap-action float type lever controller used with the form of the present invention illustrated in FIG. 4; and FIG. 9 is a sectional view taken on the line 9—9 of FIG. 8.

Two forms of the construction for carrying out the invention will be hereinafter described along with their manner of use in measuring liquids from an oil and gas well; however, it can be appreciated that the following description is for purposes of illustration only, and many variations may be made without departing from the scope and spirit of the present invention.

Referring first to FIG. 3 of the drawings, a separator S is supported at 11 on the ground or on a vehicle represented at G. The line 18 conducts the liquid and gas from an oil well and when the stream from the well is discharged into the separator S, the liquid drops to the bottom of the separator and the gas flows through a mist extractor represented at 12 in the top of the separator for separating entrained liquids from the gas prior to discharge of the gas through the outlet 13.

The separator S forms no part of the present invention, and any suitable separator of well-known form may be utilized.

One form of the apparatus of the present invention is represented generally by the letter A in FIGS. 1 and 3 of the drawings; it may be supported on the ground or on a vehicle by suitable supports 19. A conduit 14 connects gas outlet 13 of separator S with the top of liquid collection container C through the liquid level adjustment means designated at L for conducting gas from the separator S into the top of collection container C.

The gas from the separator S is also communicated from gas communicating conduit 14 to the upper portion of liquid receiving means 28 through conduit 26 and conduit 25. Valve P is connected between conduits 26 and 25 for a purpose as will be described in greater detail. Also, gas is communicated through the additional conduit means represented at line 35 to hydrostatically actuated control means H and from H through other conduit means represented at line 30 to the diaphragms operatively connected with valves P, I, and E as will be described in greater detail hereinafter.

A back pressure valve 15 in line 14 opens at any desired preset pressure to discharge gas therethrough from line 14.

The liquid to be measured is conducted from the separator S through the line 18 to which is connected the lower end of the container C by means of the connection 21. The connection 21 provides an opening means in the collection container C for collecting the liquid therein and also serves as the discharge for the liquid from the container after a predetermined volume is collected in the container C.

The inlet and discharge valve means I and E are arranged in the conduit 18 on each side of the connection 21 as shown in FIGS. 1 and 3, the inlet valve means I being open and the discharge valve means E being closed as the predetermined volume of liquid is collected in the container, and the discharge valve means E being open and the inlet valve means I being closed as the predetermined volume of liquid is discharged from the container as will be further explained.

A control means designated at H is actuated by the liquid level in the means designated generally at T which includes member 28 to sequence the opening and closing of valves I, E, and P so that the valves I, E, and P are always opened and closed in proper order. That is, when the container C has collected its predetermined volume of liquid, the control means H functions to first close valve means I and P substantially simultaneously and then open discharge valve means E for discharge of the measured liquid volume from container C. The control means maintains the valves in this position until the measured liquid volume is discharged from the container C whereupon the control means H is again actuated to first close valve E and then open valve P and valve I for collecting another predetermined volume of liquid in container C. This cycle of operation continues as long as the apparatus A is in use.

It is believed that a short description of certain components used in practicing the present invention will better enable an understanding of the cooperation of these components in the functioning of the apparatus in the manner generally above described.

The valves I and P which are operatively connected to the hydrostatically actuated means H are both of the same form, one suitable form of valve I being shown in FIG. 5 in closed position. The inlet valve I includes the upper body 75 in which is mounted the diaphragm 76 which separates the upper body into compartments 75a and 75b and also includes the lower body 77 in which is formed the compartments 77a and 77b which communicate when the closure member 78 is off its seat and which do not communicate when the closure member 78 is seated as shown in FIG. 5. The closure member 78 is connected to diaphragm 76 by the rod 79, there being suitable seal means 79a about rod 79 to inhibit communication of fluid between the upper body 75 and lower body 77. The spring 79b tends to urge valve member 78 and diaphragm 76 so that the valve I is toward open position.

An opening 75c in upper body 75 is provided for connection with line 35 as shown at 37 in FIGS. 1 and 5 whereby gas is always communicated to compartment 75a. An opening 75d is provided for connecting line 30 to compartment 75b beneath diaphragm 76 as shown at 32 in FIG. 1. As a practical matter, the spring 79b is very light so that the opening and closing of valve I is determined by the presence or lack of gas pressure in compartment 75b. When there is gas pressure in compartment 75b, it opposes the gas pressure always present in compartment 75a, and the spring opens valve I. Similarly, when the gas is exhausted from compartment 75b, the pressure in compartment 75a on diaphragm 76 closes valve I.

The valve P, for purposes of description and illustration of the present invention, may be similar to valve I. It will be noted that line 35 communicates to the valve P to always close valve P when the gas is exhausted through line 30 from beneath the diaphragm of valve P. The function and purpose of valve P will be described in greater detail in connection with the means T which actuates the control H.

The exit or outlet valve E is best seen in FIG. 6 and is normally termed a single acting valve. The valve E is installed in the line 18 and has an upper body 75' and a lower body 77'. A suitable diaphragm 76' is positioned in the upper body 75' and divides such upper body into two compartments 75a' and 75b'. The upper body 75' has an opening 75c' which is connected to the line 30 as shown at 31 in FIGS. 1 and 6. The body 75' also has an opening 75d' in which a breather plug 75e' is positioned therein for communicating with the atmosphere. The plug 75e may be removed to permit the removal of any liquid which may become trapped in the compartment 75b'. The lower body 77' has compartments 77a' and 77b' which are separated by the closure member 78'. The rod 79' has suitable seal means 79a' thereabout for inhibiting the flow of fluid between the lower body 77' and the upper body 75'. The valve E is opened by liquid pressure differential in line 18 and by release or exhausting of the pressure in line 30 acting on the top of diaphragm 75' in chamber 75a' and is closed by movement of the diaphragm 76' by pressure in chamber 75a' from line 30. The valve E is also illustrated in a closed position and would be in such closed position when pressure is exerted on the top of the diaphragm 76' through line 30. When the gas pressure is exhausted from compartment 75a' through line 30, the closure member 78' is moved to an open position and liquid is permitted to move through the line 18, through the lower body 77', and out of the line 18. When the container C is discharging or dumping the predetermined liquid volume and with the pressure bled from the compartment 75a', the pressure exerted by the liquid in the line 18 on the closure member 78' is sufficient to cause the closure member 78' to be raised and thus the valve E opened.

The hydrostatically actuated control means H is actuated by hydrostatic pressure, and a suitable form of the control is more clearly seen in FIG. 7. The control means H regulates the flow of gas from gas supply 35 to the line 30 that is in turn connected to communicate with the diaphragm of valves I, P, and E as above described. When gas is supplied through the control H to line 30, valves I and P are opened and valve E is closed, and when gas is not supplied through the control H, the line 30 exhausts through line 42 and port 93c in body 90 of control H so that valves I and P close and valve E opens.

The body 90 of control H includes the upper, central, and lower portions 91, 92, and 93. The upper portion 91 is separated from the central portion by the diaphragm 94, and the lower portion 93 is separated from the central portion 92 by the diaphragm 95. The central portion 92 is divided into two compartments 92a and 92b by the diaphragm 96. The diaphragms 94, 95, and 96 also provide a means of support for the control assembly 96' as shown in FIG. 7, and the position of the control assembly 96' determines whether gas is supplied to line 30 or whether line 30 is exhausted to the atmosphere through line 42 and port 93c in the lower body portion 93. As shown in the drawings, the control assembly 96' is in position to communicate line 43 and line 42 for supplying gas from line 35 to the line 30.

The line 43 is connected into port 92c in central body portion 92, the port 92c in turn communicates with chamber 92a. A passage 96a in assembly 96' communicates chamber 92a with chamber 93a through reduced opening 97a in the end of assembly 96'. A valve member 97 having closure elements 97' and 97 formed on each end thereof extend through the reduced opening 97a as shown in the drawings, and the lower closure element 97 will seat on the upper end 97b of opening 93c when the assembly 96' is in the position shown in FIG. 7 of the drawings, and its upper closure elements 97' will clear the upper end of the reduced bore 97a' so that gas from line 43 may flow through 96a and 97a' and into chamber 93a for discharge through line 42 into line 30. A spring 95' positioned in chamber 91a urges the assembly 96' downwardly to the position above described, and the force of spring 95' may be varied by means of the threaded bolt 98 extending through the opening 91c in top 91d of the upper body portion 91 to engage the cap provided on top of the spring 95'.

A conduit 40 is connected into passage 92d that communicates with chamber 92b beneath diaphragm 96 and is adapted to receive liquid from the actuating means T, and when the liquid pressure in chamber 92b overcomes the force of spring 95', the control assembly 96' is moved upwardly to seat the upper closure 97' on the upper end of passage 97a and unseat the lower closure element 97 from the upper end 97b of port 93c. Communication between gas supply line 43 and the line 42 is thereby shut off while line 42 exhausts line 30 and line 41 connected to chamber 91a by opening 91b to atmosphere through port 93c.

The actuating means T for the control H includes a liquid receiving member 28 which is adapted to receive liquid from container C as the collection container C is filled with the predetermined liquid volume. An opening 28a shown in the lower end of member 28 enables liquid to be conducted to 28 as the collection container C is filled.

The member 28 is illustrated as being vertically positioned within container C. The member 28 is provided with a sight gauge tube 68 on the exterior of container C, the gauge being connected to member 28 through container C by the conduit portions 69 and 70. The liquid receiving conduit 40 is connected to tubular member 28 at the lower portion thereof as represented by the numeral 27 in FIG. 1.

The member 28 is shown as being of tubular form whose volume is substantially small in relation to the volume of liquid to be collected in container C. Since the control means H responds to the liquid level in the member 28, this enables a more accurate and sensitive measuring arrangement than heretofore possible. When the liquid rises to a predetermined level in the member 28, this actuates control H so that control assembly 96' opens line 30 to atmosphere and closes off line 43 from communicate with line 30 through line 42. This immediately closes valve P and valve I substantially simultaneously and then opens valve E to enable the liquid volume collected in container C to discharge. The closing of valve P traps the gas in line 25 above member 28 and in line 43 and prevents the liquid level in member 28 from falling until the liquid in container C has fallen to uncover the opening 28a in the lower end of member 28. Since the liquid level in 28 remains constant until the opening 28a is uncovered, control H is locked in position to retain valve E open and valves I and P closed.

However, as soon as the opening 28a is uncovered, the liquid falls from the member 28 and this withdraws the liquid from chamber 92b through line 40 so that the control assembly 96' is urged to a position to close off port 93c and open gas supply line 43 to the line 30. The gas supplied through line 30 acts on the diaphragms of valves E, I and P to close valve E and then open valves I and P by balancing the pressure retained on the other side of their diaphragm through line 35 whereupon they each open by reason of the spring tending to move them to open position.

In initially starting to use the present invention, it is necessary to first of all calibrate the container C so that it will collect a predetermined volume before discharge thereof. For example, assume that it is desired to collect one barrel of liquid in collection container C before dumping it from the container. After the apparatus is hooked to the separator S as previously described, the control H opens valves I and P and closes valve E since the assembly 96' is free to be moved down by spring 95' and gas is then conducted from 14 through line 26, valve P, line 25, and into line 35 to control H. It then flows to line 30 to close valve E and balance the diaphragms on valves I and P so that the spring of each valve urges it to open position.

The position of the opening 28a in the liquid receiving means 28 is known and this therefore determines the lower liquid level 60 in collection container C since the lower liquid must be slightly below the opening 28a to permit draining of the member 28. The liquid level in container C is usually indicated by the calibrations 65a on the sight gauge 65 and the lower liquid level 60 in container C may be initially marked by adhesive tape or the like at 65c on the sight gauge 65. The gauge 65 is mounted on container C by the conduit connections 66 and 67, respectively. A quantity of liquid is then collected in the container C and at the same time the liquid is received in member 28 and in chamber 92b which connects with 28 by the connection 40. The liquid rises in container C only to the lower end 50a of the tube 50 which is represented by the liquid level designated at 59. Since the lower end of tube 59 is closed off by the liquid, no additional liquid can be collected in the container C, but the liquid at this level may rise slightly in tube 50 to a level as represented at 50d. The liquid continues to rise in member 28 to a level 71 which is slightly above, such as one inch, the level 59 in the container C. The level 59 in container C and level 71 in tube 28 may be marked on gauges 65 and 68 by adhesive tape during the calibrating operation. These levels are represented by the numerals 65b and 72, respectively.

The control means H is set to react when the liquid level 71 is reached in member 28 whereupon valves I and P are closed prior to opening valve E. The liquid from container C between levels 59 and 60 discharges through E and is collected and measured to indicate if the tube 50 of liquid level adjustment means L is to be raised or lowered. If the collected liquid from container C measures more than the desired amount, in this case one barrel, then the tube 50 is moved down into the container C a predetermined amount. If the desired volume is not enough, the tube 50 is raised to enable more liquid to be received in the container C.

After the collection container C is calibrated so that the correct upper level 59 is determined to yield the exact predetermined volume from the container, care must be exercised to insure that the liquid level 71 in member 28, in which control H is actuated, is slightly above the liquid level 59 in the container C. The bolt 98 on control H is adjusted so that the control will react at the desired liquid level in member 28. Thus, the control H is responsive to or actuated by a level in the means T which is independent of and in excess of the liquid level in container C, and as previously noted, this provides an arrangement which is far more accurate and sensitive than possible with prior art devices.

The upper level liquid adjustment means L used in calibrating the vessel and in adjusting the liquid level is shown in more detail in FIG. 2 and includes the tube 50 which may be of any desired length and is slidably positioned in the tubular member or sleeve 51. The tube 50 has calibrations 50c thereon for indicating the position of the tube 50 in the container C and for indicating fractions of a barrel of liquid. The lower end 51a of the sleeve 51 is threaded as shown at 51b for connection to the top 22 of container C at 23 as shown in FIG. 1. The upper end 51c of the member 51 is similar to the lower end 51a and is threaded as shown at 51d and adapted to engage a tee 49 or other suitable connecting means for communicating the tubular member or tube 50 with the gas line 14 and line 26.

Seal means such as O-rings 52 and 53 or the like are positioned in the upper end 51c and the lower end 51a, respectively, for sealably engaging the member 51 and the tube 50. The lower end 51a of the member 51 also has a suitable threaded opening 51e therein for receiving the set screw 54 which locks the member 50 in relation to the member 51. The member 51 has suitable handles 55 thereon for raising and lowering the tube 50 in the member 51 when the set screw 54 has been loosened sufficiently therefor. The member 51 has suitable slots or openings 56 therein through which the handles 55 extend whereby the handles 55 may be raised or lowered relative to member 51. Such slots 56 also enable the calibrations 50c on tube 50 to be viewed and may be varied in shape and construction as desired.

Thus, after the liquid from container C is initially measured, the tube 50 is raised or lowered as previously noted, and since the inner diameter of the container C is known, as is the volume that is to be added to or taken from the initially measured volume, the tube 50 in the container is adjusted so that the exact volume desired can be collected in container C and then discharged through valve E.

A suitable counter mechanism or means 45 is connected to line 30 as shown in FIG. 1 of the drawings and for each cycle of operation of the apparatus A, it is actuated to indicate the total number of volumes collected in and then discharged from the container C.

Additionally, the control arrangement or mechanism T functions to maintain the valves I and E as well as the control head H in a predetermined relationship when the container C is receiving liquid and when the container C is discharging liquid therefrom to assure collection of the proper volume of liquid within the container C and discharge of a proper volume of liquid from the container C at all times.

The control means T includes a liquid receiving member or means designated at 28 which is communicated with the collection container C by suitable means such as the opening 28a in the lower end of the means 28.

An alternate form of the present invention is illustrated in FIG. 4, and the same parts or substantially identical parts as in the FIG. 1 modification are designated with the same numerals. Other parts are designated by numerals in the 100 series. The alternate embodiment is designated generally at A' and includes container C', the valves I, E, and P and controls T' and M which accomplish the same or similar as the valves I, E, and P and controls T and H in the apparatus A. The control means provided for the alternate form of the apparatus A' is shown in FIG. 4 and includes a float control mechanism designated generally at D and a valve M actuated thereby. The float type controller D and the valve M cooperate so that gas may be supplied from the line 35 to the line 30 as described with regard to the FIG. 1 modification so as to close valve E and open valves I and P for the collection of liquid in the container C' and also function to open line 30 to atmosphere so as to exhaust gas from the line 30 through the line 105 which is connected to the line 30 and then through the discharge or outlet conduit or opening 104 provided in valve M.

It is to be also noted that the means T' which actuates the control D and valve M is somewhat different from the control T described with regard to the FIG. 1 modification. The control T includes a tubular member designated 128 which is similar in function to the tubular member 28, the member 128 including an enlarged portion 101 at the upper end thereof in which is received the float 102. The float 102 is connected with the float level controller D, and the liquid level in the tubular member 128 is thereby utilized to effect the operation of valves I, E, and P in a manner as described with regard to the FIG. 1 modification.

The float level controller D is of the snap-action type and it and valve M may be of any suitable construction and form, the details of one form of each being illustrated in FIGS. 8 and 9.

As shown in FIGS. 4, 8, and 9, the snap-action float control level D is provided with a float 102 which is adapted to respond to the liquid level in the section 101 of tubular member 128. The float 102 is connected on a rod 202, and the rod 202 extends through the bore 107' of extension 107a of enlarged portion 101 at the top of tubular member 128 and the rod 202 is connected at its other end to the stem 204 mounted in the body 203 of the level controller D. The level controller D is shown as being physically connected with the enlarged section 101 by threadedly engaging in bore 107' of the extension 107a of the enlarged section 101 as shown at 106. The enlarged section 107a extends through opening 107 of container C' and is secured to the container C' by any suitable means such as welds or the like as shown in FIG. 8 of the drawings.

The rod 202 on which the float 102 is connected at one end as shown in FIG. 4 of the drawings extends through the bore or passage 107' formed in the lateral extension 107a, and it is to be noted that the bore or passage 107' is of suitable size so as to permit the float rod 202 to move vertically a sufficient distance to actuate the snap-action controller D as will be described in greater detail hereinafter.

The stem 204 to which the rod 202 is connected is rotatably supported in the body 203 as illustrated in FIGS. 8 and 9 of the drawings, and rotation of it by the float rod 202 raises or lowers the actuating arm 207. A stuffing box 208 is also positioned in the body 203 and the stem 204 is provided with a portion designated at 204a which extends through the stuffing box 208, thereby providing a fluid tight arrangement between chambers 203a and 203b while permitting vertical movement of the rod 202 to be translated into rotating movement of the stem 204, which in turn raises and lowers the actuating arm 207 to effect operation of the valve M as will be described without fluid leakage.

It will be noted that the actuating arm 207 is provided with a slot 207a therein in which is received the switch arm 211 of the valve M as illustrated in FIGS. 8 and 9 of the drawings.

The valve M may be connected to the float level controller D by any suitable means such as screws or the like (not shown) so as to position the valve M whereby the switch arm 211 thereof may extend through the opening 203c of the body 203. The opening 203c in the body 203 of the controller D is sufficiently large to permit the vertical travel of the switch arm 211 to effect actuation of the valve M in the manner intended.

The valve M has a body 210 which has a compartment 210a therein which communicates with each of the lines 103, 104, and 105. A valve closing means 215 is positioned between the opening 212 and 213 in communication with the compartment 210a so that the valve closing means 215 may be moved to close either of the openings 212 or 213 as desired. A rod or lever 214 is pivotally connected to the valve closing means 215 and also to the switch actuating arm 211 for moving the valve closing means 215 in either the opening 212 or opening 213. A spring 216 is mounted on the arm 211 so that the lever 214 may be snapped from a position as illustrated in FIG. 8 to a raised position. Such movement of the lever 214 moves the closing means 215 so that the opening 213 will be sealed rather than the opening 212 as illustrated in FIG. 8. Suitable seal means 217 is also positioned on the arm 211 and in the body 210 of the valve M to inhibit the flow of any gas from the valve M to the controller D or vice versa. The float valve 102, which is not seen in FIGS. 8 and 9, may be connected to the rod 202 by any suitable means such as a standard threaded male and female connection.

Referring now to FIGS. 4, 8, and 9 of the drawings, it will be initially assumed that the liquid in the container C' is at the lower level designated at 60. When in this position, the float 102 will be at its lowermost position in the portion 101 of tubular member 128, and the float controller D and valve M will be in the position shown in FIG. 8 of the drawings. It will be noted that the valve M is in position so that the gas supply line 35 is communicated through the line 103 to the valve M and then through the line 105 to the line 30. In this condition, pressure in the line 30 is supplied to close the valve E and open the valves I and P in a manner as previously described with regard to the FIG. 1 modification. When the liquid level in the tubular member 128 reaches the level designated at 171 in FIG. 4 of the drawings, the float 102 is raised so that the float rod 202 has rotated the stem 204 to actuate the valve M and thereby close off the line 103. When this occurs, gas pressure is shut off between line 35 and line 30, and line 30 is exhausted to the atmosphere through line 105 and discharge or outlet conduit 104 in valve M. When this occurs as described with regard to the FIG. 1 modification, the valves I and P are first closed and thereafter valve E opened so as to discharge the volume of liquid from the container C'.

It is to be noted that a counter designated at 45 is connected with the line 30, and each time gas is resupplied to the line 30, it will effect actuation of the counter mechanism 45 in a manner as described with regard to the FIG. 1 modification.

The container C' may be calibrated in a manner as described with regard to the FIG. 1 modification and as is the case with the FIG. 1 modification; the level 171 in the portion 101 of the member 128 must be slightly above the upper level 159 in the container C' in order that the level in the member 128 will function as the operating level for the float control D and valve M. It is to be noted that the liquid level means designated at L in FIG. 4 is used in a similar manner to that described with regard to the FIG. 1 modification in order to calibrate the container C' and to determine the upper liquid level 159 in the container C' by adjusting the lower end of 50a of the liquid level adjustment member to a predetermined vertical position in the container C'.

The control H of the FIG. 1 modification and the control in the form of the float control D and valve M in the FIG. 4 modification provide an arrangement which gives substantially instantaneous response to the liquid level in the means T and T', respectively, which actuate each of them. Thus, the valves I, E, and P are either in open or closed position to accomplish their desired function, and the movement from one position to the other is smoothly and rapidly effected to avoid time lag between open and closed position of each of the valves.

A clean-out opening Cx is provided in each of the containers C and C', which clean-out opening is provided with a plug designated Cy as noted in the drawings.

Attention again is drawn to the fact that the volume of the means T and T' which actuates the control H in FIG. 1 and the control designated D and M in FIG. 4 of the drawings is substantially small in relation to the total volume to be collected in the containers C and C'. As a practical matter, the smaller the volume collected in the tubular members 28 and 128, the more accurate the volumetric measurement; however, the size of the tubular members 28 and 128, respectively, must be such so that surface tension does not interfere with the prompt discharge of the liquid through their lower opening 28a when the lower liquid level 60 is reached in the container C or C', respectively. A tubular member having an inner diameter or width of approximately one inch works quite well, but this may vary depending on the liquid to be measured.

Broadly, the present invention relates to a liquid metering apparatus and more particularly to a liquid metering apparatus which accurately and positively controls the operation of the valves and provides an arrangement for sequencing the valves and maintaining them in proper position during filling and discharge of the liquid metering apparatus.

What is claimed is:
1. An apparatus for metering liquid volumes comprising,
(a) a collection container to collect a predetermined volume of liquid,
(b) said container having an opening adapted to receive liquid in said container and to discharge liquid from said container,
(c) additional liquid container means,
(d) said additional liquid container means being adapted to hold a substantially smaller volume of liquid than said collection container,
(e) said additional liquid container means having an opening in the lower end thereof to receive liquid to a predetermined level when the predetermined liquid volume is collected in said collection container and to discharge liquid from said additional container,
(f) diaphragm actuated inlet valve means for regulating the flow of liquid into said collection container,
(g) diaphragm actuated discharge valve means for regulating the flow of liquid from said collection container,
(h) a conduit for communicating gas to said container above the liquid therein,
(i) conduit means for communicating gas from said gas communicating conduit to said additional container means above the liquid level therein,
(j) diaphragm actuated valve means in said conduit means which communicates gas to said additional container means,
(k) additional conduit means connected to said additional container means above the predetermined liquid level for communicating gas to one side of said diaphragms of each said inlet valve means and said valve means in said conduit which communicates gas to said additional container means to urge each of said valve means toward closed position,
(l) said inlet valve means and said valve means in said conduit means which communicates gas to said additional container means each having means acting on their respective diaphragms to bias said valve means toward open position as liquid is collecting in said collection container,
(m) other conduit means to communicate gas from said additional conduit means to the other side of said diaphragms of each said liquid inlet valve means and said valve means in said conduit means which communicates gas to said additional container means to counterbalance the gas pressure tending to close each of said valve means,

(n) said other conduit means also communicating gas to said diaphragm of said liquid discharge valve means to urge said valve means to closed position, (o) control means connected between said additional and said other conduit means for controlling communication therebetween and for opening and closing said other conduit means to atmosphere to actuate each of said valve means, (p) said control means responsive to the hydrostatic pressure in said additional container means when said predetermined liquid level is reached to close off communication between said additional and other conduit means and to open said other conduit means to atmosphere whereupon said liquid inlet valve means and said valve means in said conduit means which communicates gas to said additional container means each close and said liquid discharge valve opens, (q) the closing of said valve means in said conduit means which communicates gas to said additional container means acting to trap gas above the predetermined liquid level in said additional container means and in said additional conduit, (r) the gas trapped above said predetermined liquid level in said additional container means serving to hold said predetermined liquid level therein until the predetermined liquid volume is discharged from said collection container whereupon the opening in the lower end of said additional container means is exposed for discharge of liquid therefrom and into said collection container, and (s) said control means functioning when liquid is discharged from said additional liquid container means to communicate said gas communicating conduit and to said additional conduit means for gas passage therethrough to close said discharge valve means and then open said inlet valve means and said valve means in said conduit means which communicates gas to said additional container means so that said container may receive another predetermined liquid volume therein.

2. The invention of claim 1 including liquid level adjustment means on said collection container for predetermining the volume of liquid to be collected in said collection container.

3. The invention of claim 1 including liquid level adjustment means on said collection container for predetermining the volume of liquid to be collected in said container, said liquid level adjustment means including a tubular member adapted to be slidably positioned in said collection container, means supporting said tubular member on said collection container whereby said tubular member may be raised and lowered in said collection container and thereby vary the upper liquid level in said collection container, and means for locking said tubular member in said support.

4. A liquid volume metering apparatus comprising,
(a) a container to collect a predetermined volume of liquid,
(b) a liquid inlet conduit and a liquid discharge conduit for said container,
(c) a conduit for communicating gas to said container above the liquid therein,
(d) diaphragm actuated valve means for opening and closing said liquid inlet conduit,
(e) diaphragm actuated valve means for opening and closing said liquid discharge conduit,
(f) tubular means having an opening for receiving liquid to a predetermined level in said tubular means when the predetermined liquid volume is collected in said container,
(g) conduit means for communicating gas from said gas communicating conduit to said tubular means above the liquid level therein,
(h) diaphragm actuated valve means in said conduit means which communicates gas to said tubular means,
(i) additional conduit means connected to said tubular means above the predetermined liquid level for communicating gas to one side of said diaphragms of each said liquid inlet valve means and said valve means in said conduit means which communicates gas to said tubular means to urge each of said valves toward closed position,
(j) said inlet valve means and said valve means in said conduit means which communicates gas to said tubular means each having means acting on their respective diaphragms to bias said valve means toward open position as liquid is collecting in said container,
(k) other conduit means to communicate gas from said additional conduit means to the other side of said diaphragms of each said liquid inlet valve means and said valve means in said conduit means which communicates gas to said tubular means to counterbalance the gas pressure tending to close each of said valve means,
(l) said other conduit means also communicating gas to said diaphragm of said liquid discharge valve means to urge said valve means to closed position,
(m) control means connected between said additional and said other conduit means for controlling communication therebetween and for opening and closing said other conduit means to atmosphere to actuate each of said valve means,
(n) said control means responsive to the hydrostatic pressure in said tubular means when said predetermined liquid level is reached to close off communication between said additional and other conduit means and to open said other conduit means to atmosphere whereupon said liquid inlet valve means and said valve means in said conduit means which communicates gas to said tubular means each close and said liquid discharge valve opens, and
(o) the closing of said valve means in said conduit means which communicates gas to said tubular means acting to trap gas above said predetermined liquid level in said tubular means to hold said predetermined liquid level therein until the predetermined volume has discharged from said container whereupon said opening in said tubular means is exposed for discharge of liquid therefrom.

5. The invention recited in claim 4 wherein discharge of the predetermined volume of liquid from said container exposes the lower end of said tubular means to discharge liquid from said tubular means into said container whereupon said control means then responds to the loss of hydrostatic pressure in said tubular means to enable gas to flow from said gas communicating conduit to said additional conduit means to act on said diaphragms of each of said valve means to close said liquid discharge valve means and open said liquid inlet valve means and said valve means in said conduit which communicates gas to said tubular means for collecting another predetermined volume in said container.

6. The invention of claim 4 including means on said container to predetermine the volume of liquid to be collected in said container.

7. The invention of claim 5 including means on said container to predetermine the volume of liquid to be collected in said container.

8. The structure recited in claim 7 wherein said liquid volume predetermining means includes a tubular member adapted to be slidably positioned in said collection container, means supporting said tubular member on said collection container whereby said tubular member may be raised and lowered in said collection container and thereby vary the upper liquid level in said collection container, and means for locking said tubular member in said support.

9. An apparatus for metering liquid volumes comprising,
(a) a collection container to collect a predetermined volume of liquid,
(b) a liquid inlet conduit and a liquid discharge conduit for said container,
(c) diaphragm actuated valve means for opening and closing said liquid inlet and discharge conduit,
(d) additional container means having an opening for receiving liquid to a predetermined level therein when the predetermined liquid volume is collected in said container,
(e) conduit means for communicating gas to said additional container means above the liquid therein,
(f) diaphragm actuated valve means for opening and closing said conduit means which communicates gas to said additional container means,
(g) additional conduit means connected to said additional container means above the predetermined liquid level for communicating gas to one side of said diaphragms of each said liquid inlet valve means and said valve means in said conduit means which communicates gas to said additional container to tend to urge each of said valves toward closed position,
(h) a spring means acting on said diaphragm of each said liquid inlet valve means and said valve means in said conduit means which communicates gas to said additional container to urge each of said valves toward open position,
(i) other conduit means to communicate gas from said additional conduit means to the other side of said diaphragms of each said liquid inlet valve means and said valve means in said conduit means which communicates gas to said additional container to counterbalance the gas pressure tending to close each of said valve means,
(j) said other conduit means also communicating gas to said diaphragm of said liquid discharge valve means to urge said valve means to closed position,
(k) control means connected between said additional and said other conduit means for controlling communication therebetween and for opening and closing said other conduit means to atmosphere to actuate each of said valve means,
(l) said control means responsive to the hydrostatic pressure in said additional container means when said predetermined liquid level is reached to close off communication between said additional and other conduit means and to open said other conduit means to atmosphere whereupon said liquid inlet valve means and said valve means in said conduit means which communicates gas to said additional container each close and said liquid discharge valve opens,
(m) said gas in said additional conduit means acting to retain the liquid in said additional container means at said predetermined level whereby the hydrostatic pressure in said additional container means acting on said control means remains uniform until the predetermined liquid volume is discharged from said collection container, and
(n) said opening in said additional container means being exposed for discharge of liquid therefrom when said predetermined liquid volume is discharged from said container whereupon said control means responds to the loss of hydrostatic pressure in said additional container means to communicate gas from said additional conduit means to said other conduit means and to close said other conduit means to atmosphere whereby said liquid discharge valve means closes and said liquid inlet and said valve means in said conduit which communicates gas to said additional container then open so that said container may receive another predetermined liquid volume therein.

10. The invention of claim 9 including liquid level adjustment means on said collection container for predetermining the volume of liquid to be collected in said container, said liquid level adjustment means including a tubular member adapted to be slidably positioned in said collection container, means supporting said tubular member on said collection container whereby said tubular member may be raised and lowered in said collection container and thereby vary the upper liquid level in said collection container, and means for locking said tubular member in said support.

11. The invention of claim 9 including counter means responsive to each discharge of liquid from said collection container to instrumentally note the number of predetermined volumes of liquid discharged from said collection container.

References Cited by the Examiner
UNITED STATES PATENTS

| | | | |
|---|---|---|---|
| 1,521,668 | 1/25 | Bond | 73—298 |
| 2,971,377 | 2/61 | Vogel | 73—224 |
| 3,083,571 | 4/63 | Pitts | 73—224 |

RICHARD C. QUEISSER, *Primary Examiner.*

DAVID SCHONBERG, *Examiner.*